US010679521B1

(12) United States Patent
Hunn et al.

(10) Patent No.: US 10,679,521 B1
(45) Date of Patent: Jun. 9, 2020

(54) GENERATING A THREE-DIMENSIONAL PHYSICAL MAP USING DIFFERENT DATA SOURCES

(71) Applicant: Lockheed Martin Corporation, Bethesda, MD (US)

(72) Inventors: David L. Hunn, Kennedale, TX (US); Thomas Hiromoto, Dallas, TX (US); John D. Metzger, Flower Mound, TX (US); Mark E. Wear, Greensboro, NC (US)

(73) Assignee: Lockheed Martin Corporation, Bethesda, MD (US)

( * ) Notice: Subject to any disclaimer, the term of this patent is extended or adjusted under 35 U.S.C. 154(b) by 57 days.

(21) Appl. No.: 15/595,487

(22) Filed: May 15, 2017

(51) Int. Cl.
*G09B 29/00* (2006.01)
*B33Y 80/00* (2015.01)
*B41M 3/02* (2006.01)
*G06T 17/00* (2006.01)
*G06T 15/00* (2011.01)

(52) U.S. Cl.
CPC .......... *G09B 29/004* (2013.01); *B33Y 80/00* (2014.12); *B41M 3/02* (2013.01); *G06T 15/00* (2013.01); *G06T 17/00* (2013.01)

(58) Field of Classification Search
CPC ...................................................... G06C 7/02
USPC ....................................................... 382/154
See application file for complete search history.

(56) References Cited

U.S. PATENT DOCUMENTS

| 2007/0042327 | A1* | 2/2007 | Swift | G09B 25/04 434/72 |
| 2010/0102476 | A1* | 4/2010 | Higgins | B29C 33/3835 264/219 |
| 2010/0184008 | A1* | 7/2010 | Fergus | G09B 29/12 434/150 |
| 2013/0041583 | A1* | 2/2013 | Samokhin | G01C 21/3638 701/428 |
| 2013/0180327 | A1* | 7/2013 | Frederick | E21B 43/00 73/152.01 |
| 2015/0187071 | A1* | 7/2015 | Lee | G06T 7/0012 382/128 |

(Continued)

OTHER PUBLICATIONS

Shapespeare, "Make 3d Printed Topo Maps of Anywhere," Instructables, 3D Printing, 2016, http://www.instructables.com/id/Make-3d-Printed-Topo-Maps-of-Anywhere/, Autodesk, Inc., 6 pages.

(Continued)

*Primary Examiner* — Justin P. Misleh
(74) *Attorney, Agent, or Firm* — Withrow & Terranova, PLLC

(57) ABSTRACT

A method of generating a three-dimensional physical map using different data sources includes receiving, at a computing device, topographic data, e.g., digital surface model data and/or digital elevation model data, for a geographic area and also receiving map area data, e.g., coordinates, scaling, and/or resolution data, for a subset area of the geographic area. The computing device generates map data, such as computer-readable three-dimensional (3D) printer data, based on the topographic data and the map area data, which can be used by a 3D printer or other additive manufacturing process to generate a three-dimensional physical map that depicts the topographic features of the subset area.

23 Claims, 7 Drawing Sheets

(56) References Cited

U.S. PATENT DOCUMENTS

2016/0133163 A1* 5/2016 Bostick ................... G09B 5/02
                                                    434/152
2016/0357370 A1* 12/2016 Willey .................. G06F 3/0482
2017/0091993 A1* 3/2017 Andrew .............. G06F 3/04812
2018/0053345 A1* 2/2018 Zou ....................... G06T 15/005
2018/0162011 A1* 6/2018 Friend ................... B33Y 40/00

OTHER PUBLICATIONS

Coldewey, Devin, "These custom 3D-printed topographical maps could make nice stocking stuffers," TechCrunch, Dec. 13, 2016, https://techcrunch.com/2016/12/13/these-custom-3d-printed-topographical-maps-could-make-nice-stocking-stuffers/, Oath Inc., pp. 1-6.

* cited by examiner

GENERATING A THREE-DIMENSIONAL PHYSICAL MAP USING DIFFERENT DATA SOURCES

TECHNICAL FIELD

The disclosure relates generally to generating a physical map and, more particularly, to generating a three-dimensional physical map using different data sources.

BACKGROUND

Two-dimensional maps, i.e., paper maps, have significant drawbacks when used in the field, such as in a tactical military operation. For example, many tactical military operations rely on resources local to the operational area of a geographic region, such as indigenous individuals, for information and support related to the operational area. In many operations, however, particularly in forward-deployed areas, these individuals may have limited or no map-reading skills, which can lead to inefficient military operations, and may potentially result in catastrophic failures, such as friendly fire. In addition, many widely available maps exclusively rely on historical geographic information system (GIS) data, which is years or decades old for many geographic areas, and which may not reflect the current state of the local terrain within the operational area. Thus, there is a need for maps having improved readability and increased accuracy for use in the field.

SUMMARY

The disclosure relates generally to generating a physical map and, more particularly, to generating a three-dimensional physical map using different data sources. According to an embodiment, a computing device receives topographic data, e.g., digital surface model data and/or digital elevation model data, for a geographic area and also receives map area data, e.g., coordinates, scaling, and/or resolution data, for a subset area of the geographic area. The computing device generates map data, such as computer-readable three-dimensional (3D) printer data, based on the topographic data and the map area data, which can be used by a 3D printer or other additive manufacturing process to generate a 3D physical map that depicts the topographic features of the subset area.

According to one embodiment, a method of generating a physical map using an additive manufacturing process is disclosed. The method includes receiving, at a computing device, topographic data corresponding to topographic features of a geographic area. The method further includes receiving, at the computing device, map area data corresponding to a subset area of the geographic area. The method further includes generating, at the computing device, map data based on the topographic data and the map area data, the map data including machine-readable instructions for generating a physical map using an additive manufacturing process, the physical map including a three-dimensional depiction of the topographic features of the subset area.

According to another embodiment, a computing device for generating a physical map using an additive manufacturing process is disclosed. The computing device includes a processing device. The processing device is configured to receive topographic data corresponding to topographic features of a geographic area. The processing device is further configured to receive map area data corresponding to a subset area of the geographic area. The processing device is further configured to receive map data based on the topographic data and the map area data, the map data including machine-readable instructions for generating a physical map using an additive manufacturing process, the physical map including a three-dimensional depiction of the topographic features of the subset area.

According to another embodiment, a non-transitory computer-readable medium is disclosed. The non-transitory computer-readable medium includes machine-readable instructions. The machine-readable instructions are configured to cause a processing device to receive topographic data corresponding to topographic features of a geographic area. The machine-readable instructions are further configured to cause the processing device to receive map area data corresponding to a subset area of the geographic area. The machine-readable instructions are further configured to cause the processing device to receive map data based on the topographic data and the map area data, the map data including machine-readable instructions for generating a physical map using an additive manufacturing process, the physical map including a three-dimensional depiction of the topographic features of the subset area.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first topographic data" and "second topographic data," and does not imply a priority, a type, an importance, or other attribute, unless otherwise stated herein.

As used herein and in the claims, the articles "a" and "an" in reference to an element refers to "one or more" of the element unless otherwise explicitly specified.

The disclosure relates generally to generating a physical map and, more particularly, to generating a three-dimensional physical map using different data sources. According to an embodiment, a computing device receives topographic data, e.g., digital surface model data and/or digital elevation model data, for a geographic area and also receives map area data, e.g., coordinates, scaling, and/or resolution data, for a subset area of the geographic area. The computing device generates map data, such as computer-readable three-dimensional (3D) printer data, based on the topographic data and the map area data, which can be used by a 3D printer or other additive manufacturing process to generate a 3D physical map that depicts the topographic features of the subset area.

Figure 1:
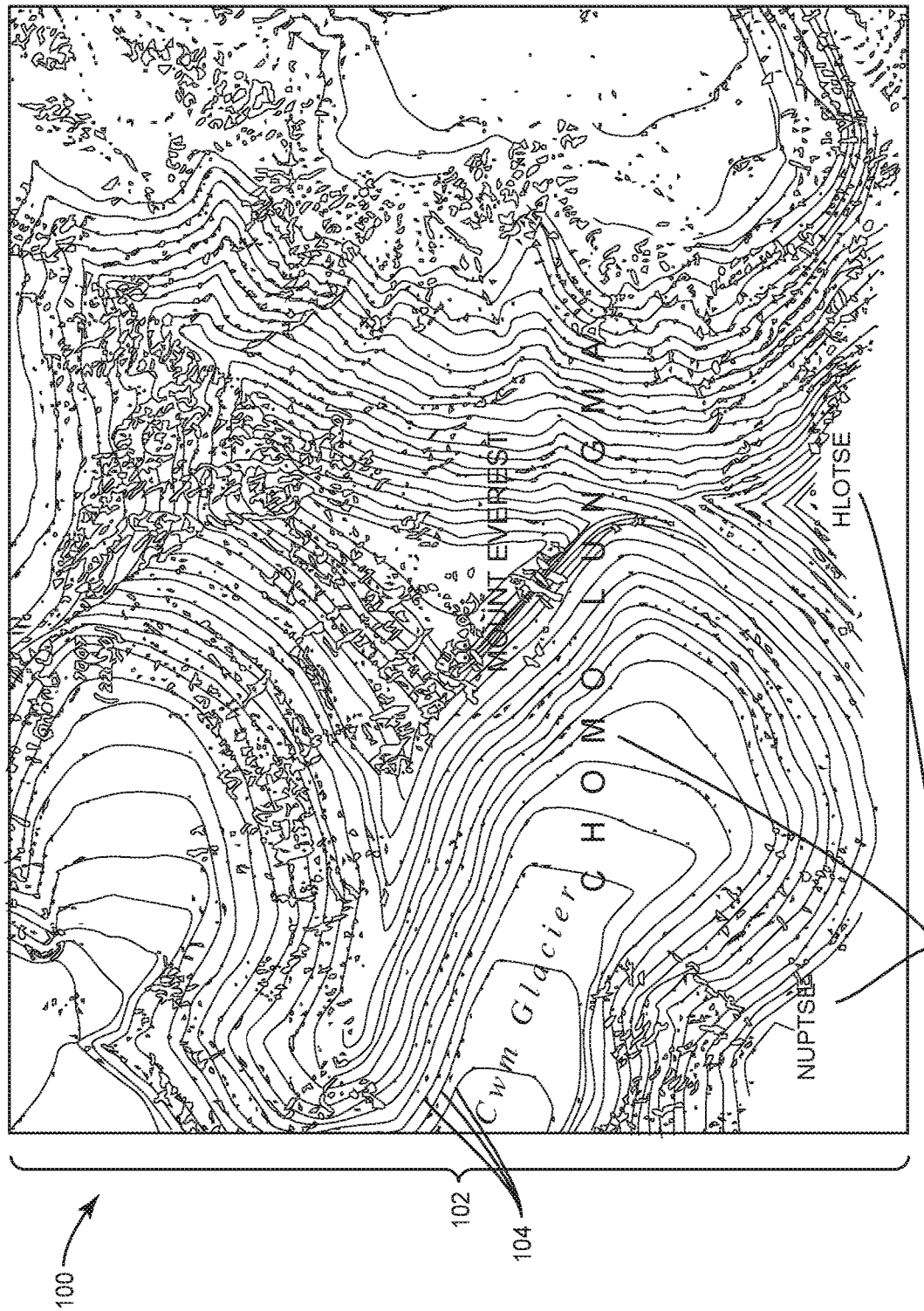
FIG. 1 illustrates a graphical depiction of a two-dimensional (2D) elevation map, according to the prior art.

Before discussing the embodiments disclosed herein, reference is first made to FIG. 1, which illustrates a graphical depiction of a two-dimensional (2D) elevation map 100, according to the prior art. The 2D elevation map 100 includes a bounded region 102 corresponding to a top-down, rectangular-shaped area within a larger overall geographic area, e.g., the Mount Everest region of Nepal in this example. In this example, the 2D elevation map 100 includes contour lines 104 indicative of changes in elevation, and may also include text labels 106, which are overlaid on top of the graphical features of the 2D elevation map 100.

One drawback of traditional 2D elevation maps, such as the 2D elevation map 100, is that it may be difficult to visualize changes in elevation when the 2D elevation maps 100 are used in the field. In some cases, such as in a tactical military operation that relies on local resources, e.g., a person, these local resources may not be able to accurately read or interpret the 2D elevation map, which may impede operations efficiency and effectiveness. In addition, many widely available 2D elevation maps exclusively rely on historical geographic information system (GIS) data, which is years or decades old for many geographic areas, and which may not accurately reflect the current state of the terrain within the geographic area. These maps also generally do not contain information regarding additional terrain features, such as tree coverage, or other landmarks such as structures. Another drawback of 2D elevation maps like the 2D elevation map 100 is that paper maps are not particular durable, and paper maps may not stand up to the rigors of harsh conditions when used in the field, such as in a tactical military operation.

Figure 2A:
FIGS. 2A and 2B illustrate a top perspective view and a side cutaway view of a three-dimensional (3D) printed elevation map, according to an embodiment.
Figure 2B:
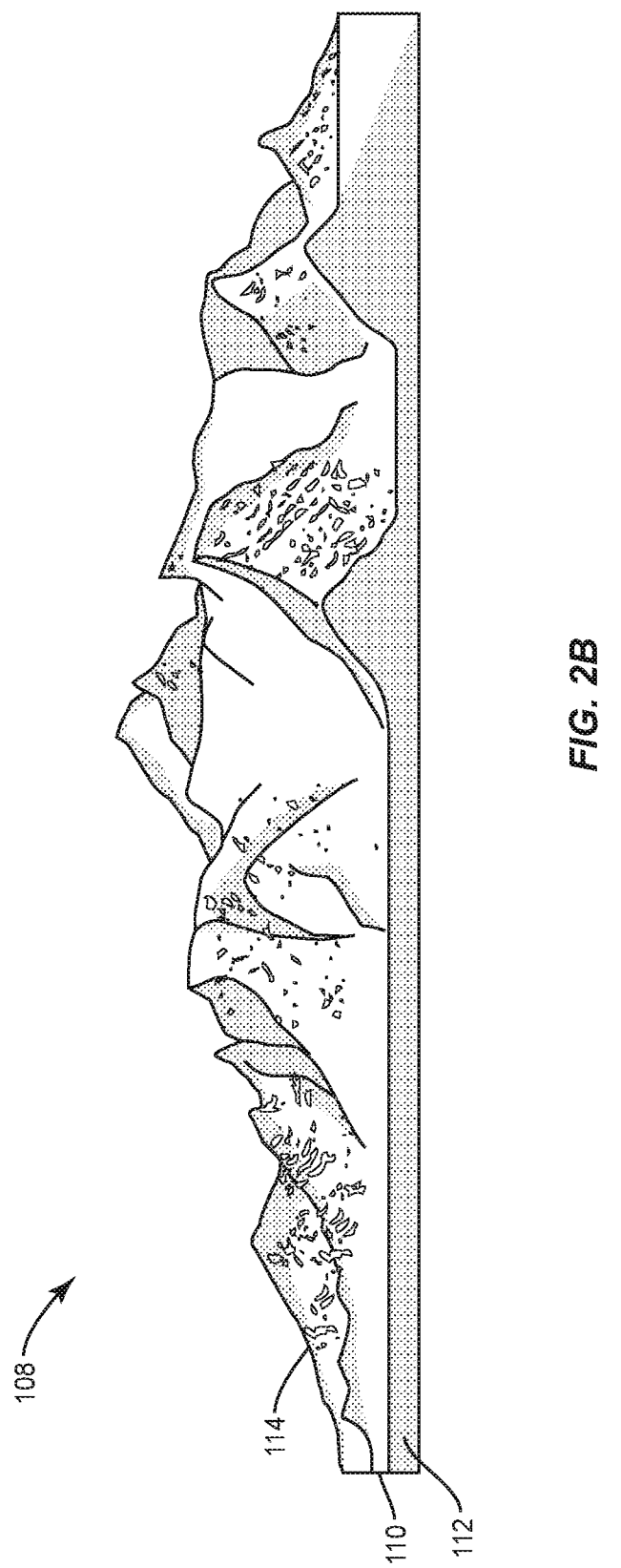

To address these and other issues, FIGS. 2A and 2B illustrate a top perspective view and a side cutaway view of a 3D printed elevation map 108 according to an embodiment. In this regard, the 3D printed elevation map 108 is formed from an additive material 110, such as, for example, rigid or flexible plastic, or another suitable material. In this example, the 3D printed elevation map 108 includes a base 112 and a contoured surface 114 representative of the actual elevation and other terrain features of a particular geographic area. In this example, the geographic area of the 3D printed elevation map 108 depicts the Mount Everest region of Nepal, similar to the conventional 2D elevation map 100 of FIG. 1 above. The use of a 3D printed map, such as the 3D printed elevation map 108 of FIGS. 2A and 2B, in the field has a number of advantages over 2D elevation maps. These advantages include increased durability as well as a more detailed, 3D depiction of actual elevation changes and other terrain features in the geographic area, which may not necessarily be conveyed as vividly using a 2D elevation map, such as the 2D elevation map 100 of FIG. 1.

Figure 3:
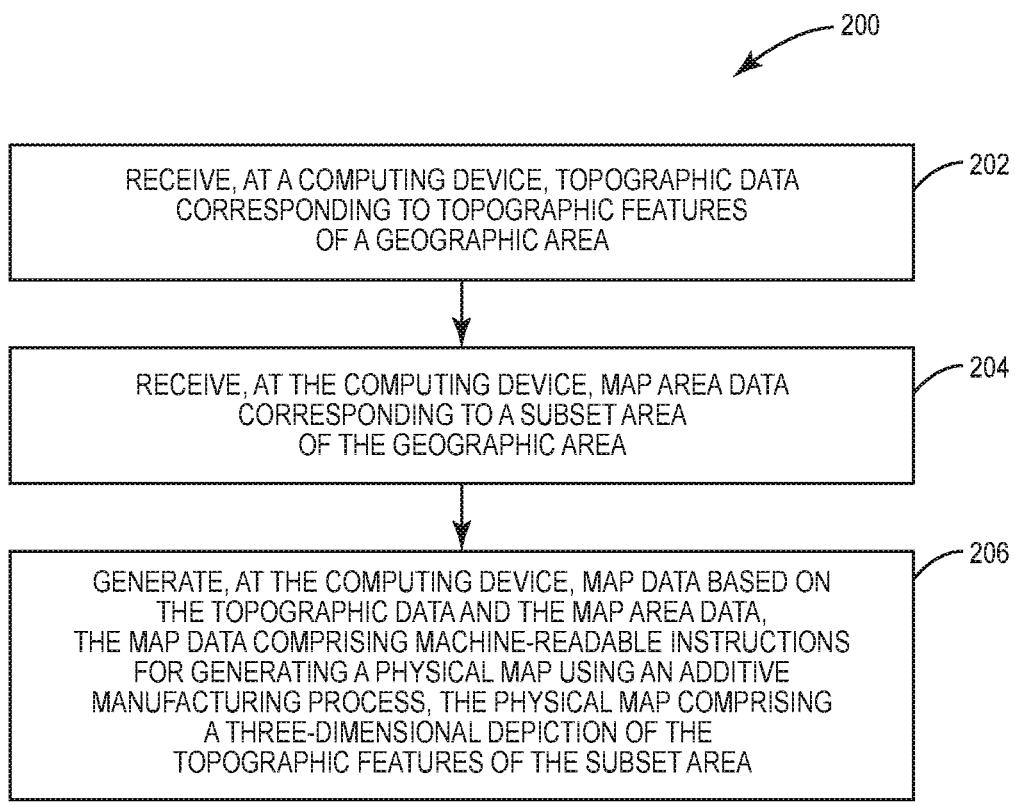
FIG. 3 illustrates a flowchart diagram of a method for generating a physical map, such as the 3D printed elevation map of FIGS. 2A and 2B, according to an embodiment.

Referring now to FIG. 3, a method 200 of generating a physical map, such as the 3D printed elevation map 108 of FIGS. 2A and 2B, using an additive manufacturing process, such as 3D printing, is illustrated. The method 200 includes receiving, at a computing device, topographic data corresponding to topographic features of a geographic area (Block 202). As will be described in greater detail below with respect to FIG. 4, topographic data may be drawn from a variety of sources, including digital surface model data, digital elevation model data, subterranean model data, tactical imagery, and other sources. The topographic data may also include a combination of two or more of these or other sources.

The method 200 further comprises receiving, at the computing device, map area data corresponding to a subset area of the geographic area (Block 204). As will be discussed in greater detail below, the map area data may include orthographic coordinates, vector coordinates, or other data indicative of a bounded subset area within the overall geographic area of the topographic data. In embodiments where the topographic data includes topographic data from multiple sources and types, the map area data is used to harmonize, align, and scale the different topographic data inputs in order to form a single bounded area for the physical map, such as the 3D printed elevation map 108 of FIGS. 2A and 2B.

The method 200 further comprises generating, at the computing device, map data based on the topographic data and the map area data (Block 206). In this example, the map data comprises machine-readable instructions for generating a physical map using an additive manufacturing process, with the physical map comprising a 3D depiction of the topographic features of the subset area. The data can then be used by a 3D printer or other additive manufacturing device or system to generate the physical map using any suitable material.

Figure 4:
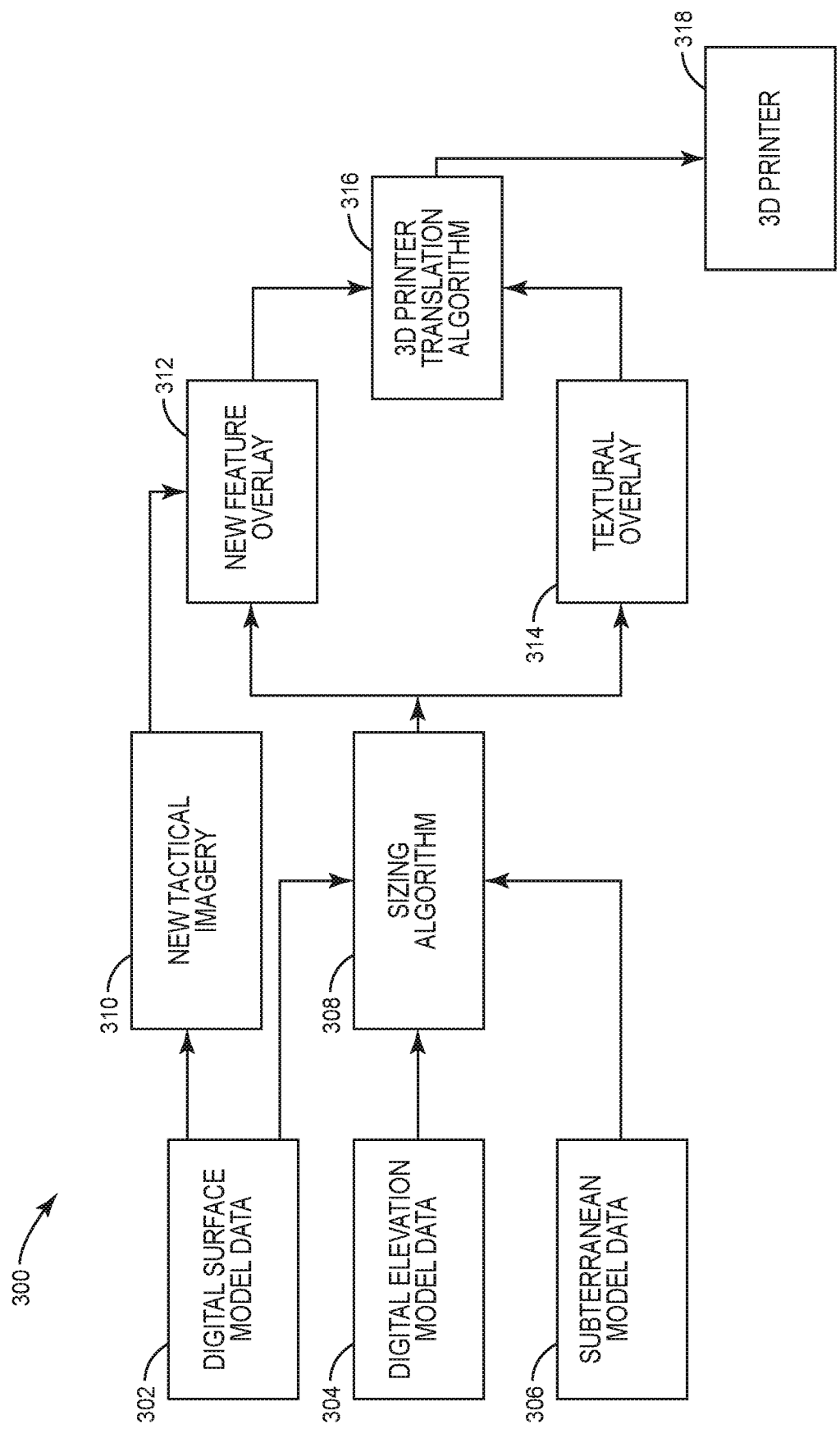
FIG. 4 illustrates a flowchart diagram of a process for generating the physical map using an additive technology process, according to an embodiment.

Referring now to FIG. 4, a process 300 for generating a physical map using an additive technology process is disclosed. In this example, many of the elements of the process 300 may correspond to one or more elements of the method 200, or vice versa, but it should be understood that both the method 200 of FIG. 3 and the process 300 of FIG. 4 may be altered to add or remove elements, as desired.

In the process 300 of FIG. 4, different types of topographic data may be generated and provided, including digital surface model data 302, digital elevation model data 304, and/or subterranean model data 306, for example. Examples of digital surface model data 302 include Precision Terrain, Light Detection and Ranging (LiDAR), point clouds extracted from aerial imagery, etc. The digital surface model data 302 may depict surface features, such as trees, structures, etc., and may also include vector models for depicting roads, boundaries, water, or other paths of interest within the geographic area. Examples of the digital elevation model data 304 include similar inputs used for the digital surface model data 302 and GIS data. The digital elevation model data 304 may depict bare earth terrain for the geographic area of interest, and, as discussed in greater detail below, may be combined with other data, such as the digital surface model data 302, to depict a more detailed and accurate depiction of local features and conditions.

The subterranean model data 306 may depict caves, tunnels, and other underground features that may not be accurately depicted using a conventional two-dimensional elevation map, such as the 2D elevation map 100 of FIG. 1. For example, in a cave or other subterranean space, each horizontal coordinate within the subterranean model data 306 may have two or more elevation coordinates, i.e., a floor elevation and a ceiling elevation, which is difficult to depict in a meaningful way in a 2D format, such as the 2D elevation map 100 of FIG. 1.

A sizing algorithm 308 receives one or more of the digital surface model data 302, digital elevation model data 304, and/or the subterranean model data 306, and processes the received data to match the scale, fidelity, and other aspects of the received data corresponding to a predetermined subset area of interest of the geographic area. The sizing algorithm 308 outputs map data corresponding to the subset area of interest based on the one or more inputs.

In some embodiments, the sizing algorithm 308 is configured to provide the ability to print to standard or custom map scales (e.g., 1:600, 1:10K, 1:250K, etc.) at standard or custom terrain resolution specifications (e.g., Digital Terrain Elevation Data (DTED) I-III, High Resolution Terrain Elevation (HRTe), etc.). The sizing algorithm 308 may use an adaptive triangulation approach where elevation post values are interpolated based on a managed triangle mesh that represents the terrain. Triangles are split based on an error criterion (spherical error) specified by the map product resolution and scale (e.g., 30 m, SE90).

The sizing algorithm 308 may also define contour intervals, which may be applied across the processed data, which in turn define the overall resolution and precision of the resulting 3D printed elevation map, such as the 3D printed elevation map 108 of FIGS. 2A and 2B. The contour interval resolution of the sizing algorithm 308 of FIG. 4 may also affect the resulting file size for the machine-readable instructions for generating the physical map. In addition, in embodiments that use subterranean model data 306 for example, the sizing algorithm 308 may also output map data that depicts a negative volume, e.g., an interior of a cave or other subterranean features, as a solid volume, and vice versa. In this manner, a 3D printed depiction of an interior of a subterranean space can be formed, with the interior coordinates of the subterranean space defining a virtual "mold" for the 3D printed map of the subterranean space.

In this example, new tactical imagery 310, which may include real-time or near real-time imaging of the geographic area, may also be incorporated into the map data generated by the sizing algorithm 308. For example, the new tactical imagery 310 may be collected by satellite imaging, or by manned or unmanned aircraft imaging, for example. In this example, the new tactical imagery 310 is first processed by a new feature overlay algorithm 312 to determine the location of the objects of the new tactical imagery 310 and to correlate the objects of the new tactical imagery 310 with the same objects depicted by the digital surface model data 302, or other data, as desired. The new feature overlay algorithm 312 next modifies the map data output from the sizing algorithm 308 to depict these new features in the resultant physical 3D printed elevation map. The new feature overlay algorithm 312 may also include data indicating the recent changes, such as changes resulting from the new tactical imagery data 310, and may reflect the changes in the map data by affecting visible indicia representative of the changed features within the physical 3D printed elevation map.

The new tactical imagery 310 may include tactical 3D data (e.g., a point cloud) obtained through LiDAR sensors, electro-optical (EO) sensors, and/or photogrammetry techniques, for example. The additional data yields an updated 3D inset region that the new feature overlay algorithm 312 can integrate into the original elevation model. The sizing algorithm (308) co-registers the updated 3D inset region to the existing model and replaces the existing model values with the latest tactical information. The result is an updated, near real-time terrain that can be printed independently, or as part of the original map extent. 3D-to-3D registration may be performed by the sizing algorithm 308 through applying image correlation techniques (e.g., Oriented and Rotated BRIEF (ORB) and normalized cross-correlation (NCC)) on a 2D-projected, elevation-shaded rendering of the terrain surface, for example. This results in terrain-to-terrain tie points, which are used to transform tactical data into a projection of the existing model.

In another example, the new tactical imagery 310 may be collected from tactical assets and automatically registered to the existing imagery mosaic using an ORB feature detector and NCC to create image-to-image tie points. The new tactical imagery 310 may then be projected into the map projection by the new feature overlay algorithm 312 based on the updated camera model that was computed from the newly-generated tie points. Once projected, the map can be printed with the latest tactical imagery.

In this example, these changes may be represented by a different color or texture in the physical 3D printed elevation map, which may be achieved by using a differently colored additive material for areas representing recent changes, for example. The process 300 also includes the ability to add textual overlay data 314 to the map data, which may include text, numbers, a cardinal rose to indicate direction, or other non-geographic features that may be useful to include in the physical 3D printed elevation map. The textual overlay data 314 may modify the map data to include embossed text, or may alter the color of the additive material, in order to convey the information in the text without interfering with the contours of the physical 3D printed elevation map. In another example, an optically transparent material may be used to represent an overall topography of a geographic area, and an opaque material may be disposed within the transparent material to represent subterranean features of the geographic area, thereby providing geographic context for the subterranean features.

The modified map data is next provided to a 3D printer translation algorithm 316, which converts the map data into a machine-readable format that is usable by a 3D printer 318 or other additive manufacturing device or process, to generate the physical 3D printed elevation map. One example of a suitable machine-readable format is STereoLithography (STL) format, which is a common format used by commercial 3D additive manufacturing devices, such as the 3D printer 318. The 3D printer 318 can use different types of additive material, as desired, to produce different effects, such as creating a relatively rigid 3D map, a flexible 3D map and/or a glow-in-the-dark material, which may be useful in the field or where providing external light may be difficult or undesirable.

Figure 5B:
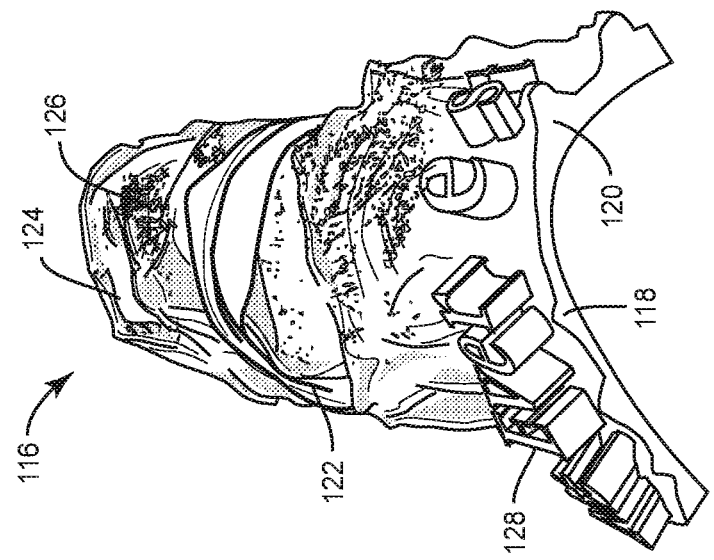
FIGS. 5A and 5B illustrate the 3D printed elevation map formed from a flexible additive material, according to another embodiment.
Figure 5A:
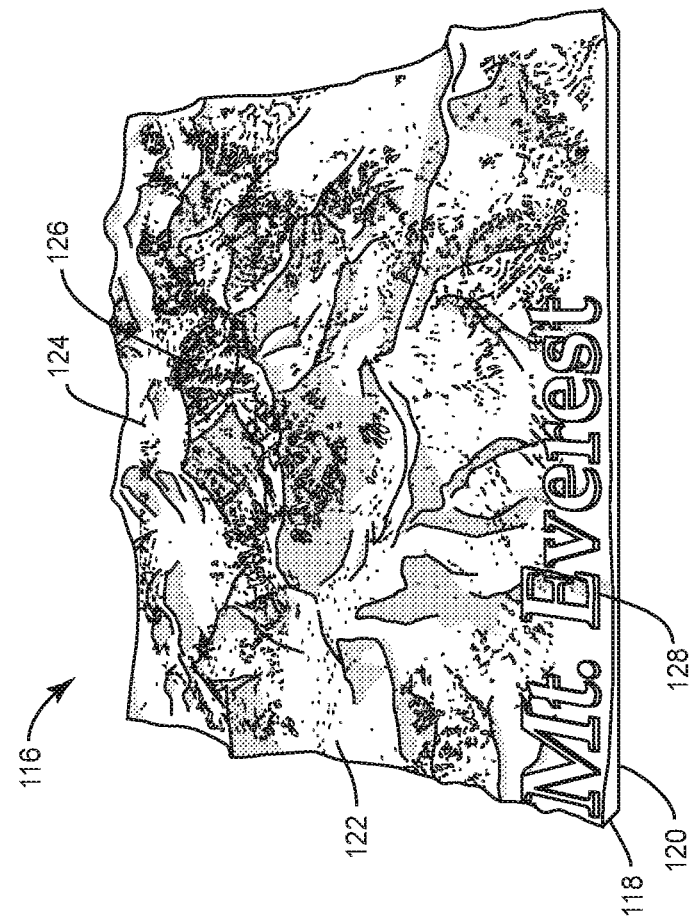

Referring now to FIGS. 5A and 5B, a 3D printed elevation map 116 formed from a flexible additive material 118 is illustrated according to another embodiment. Examples of a suitable flexible additive material 118 include rubber, flexible plastic, etc., or other flexible materials. In many embodiments, the flexible additive material 118 may be waterproof, which further increases the weather resistance and durability of the 3D printed elevation map 116, and increases the utility of the 3D printed elevation map 116 in military applications, as well as in other applications in the outdoors and/or harsh environments, e.g., for hikers, hunters, first responders, etc.

The 3D printed elevation map 116 includes a base 120 and a contoured surface 122 representative of elevation and other aspects of the terrain of the geographic area. As shown by FIG. 5B, the flexible additive material 118 in this example is sufficiently flexible that the 3D printed elevation map 116 can be folded and/or rolled for more efficient storage of the 3D printed elevation map 116.

In this example as well, the flexible additive material 118 may include a plurality of different components, such as, for example, a first material 124 having a base color, and a second material 126 having a highlight color different from the base color of the first material 124. The portions of the 3D printed elevation map 116 formed from the second material 126 may be used to highlight or draw attention to portions of interest of the terrain represented by the 3D printed elevation map 116. For example, in embodiments that incorporate new tactical imagery, such as the new tactical imagery 310 of the process 300 of FIG. 4, the portions of the 3D printed elevation map 116 of FIGS. 5A and 5B corresponding to these new or updated features may be formed from the second material 126 to highlight these features. The contoured surface 122 in this example may also include embossed text labels 128, which may take the place of separately printing text labels directly on the 3D printed elevation map 116.

Figure 6:
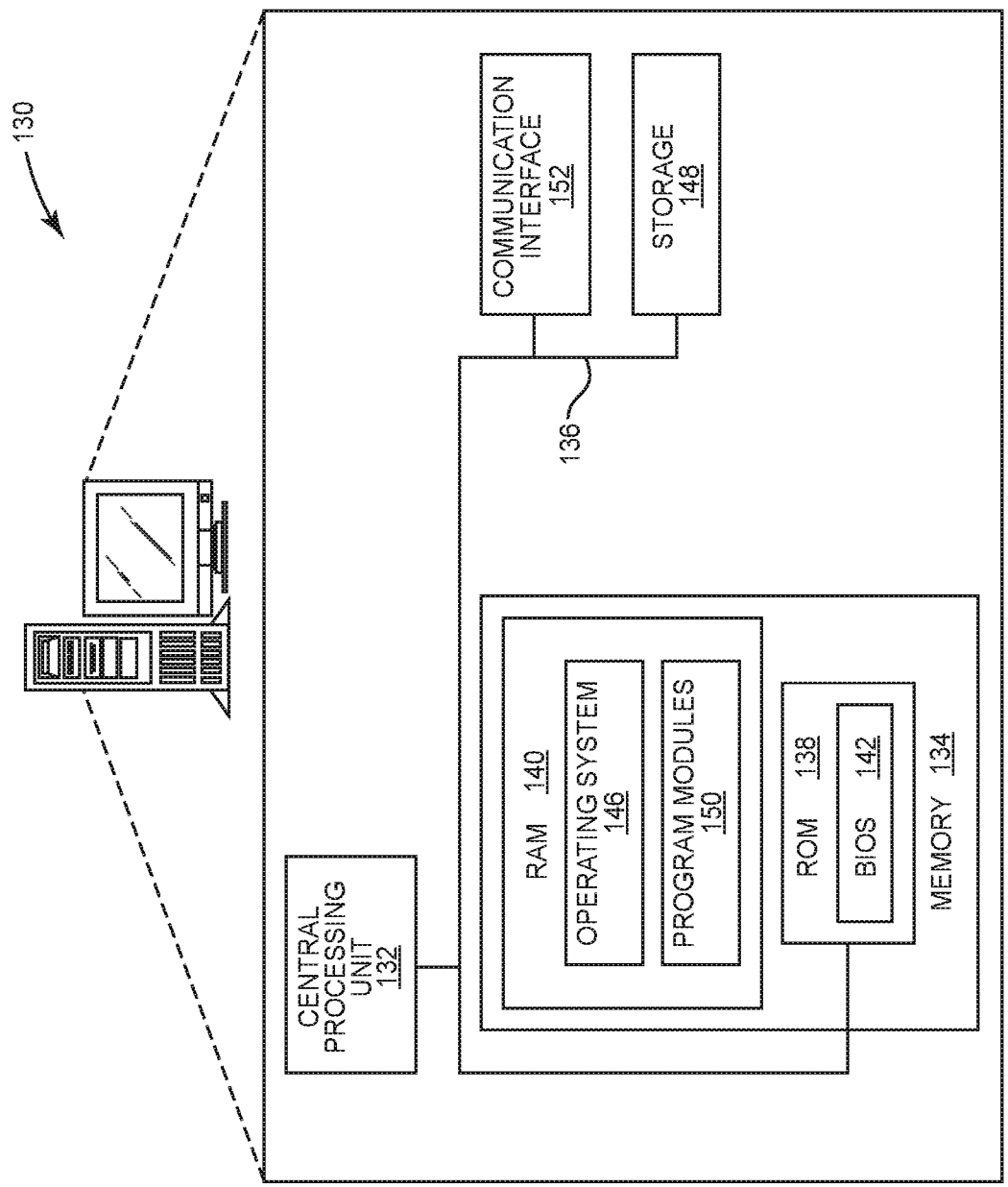
FIG. 6 illustrates a block diagram of a computing device suitable for implementing the functionality of various components discussed herein, such as aspects of the method of FIG. 3 and the process of FIG. 4.

FIG. 6 is a block diagram of a computing device 130 suitable for implementing the functionality of various components discussed herein, such as, for example, aspects of the method 200 of FIG. 3 and/or the process 300 of FIG. 4. In some embodiments, such components may be implemented on separate computing devices 130. In other embodiments, certain of the components may be implemented on a single computing device 130. These are merely examples, and the particular implementation of functionality versus individual computing devices may be system- and design-dependent.

The computing device 130 may comprise any computing or processing device capable of including firmware, hardware, and/or executing software instructions to implement the functionality described herein for the respective component. The computing device 130 includes a central processing unit 132, sometimes referred to as a processor or micro-processor, a system memory 134, and a system bus 136. The system bus 136 provides an interface for system components including, but not limited to, the system memory 134 and the central processing unit 132. The central processing unit 132 can be any commercially available or proprietary processor.

The system bus 136 may be any of several types of bus structures that may further interconnect to a memory bus (with or without a memory controller), a peripheral bus, and/or a local bus using any of a variety of commercially available bus architectures. The system memory 134 may include non-volatile memory 138 (e.g., read only memory (ROM), erasable programmable read only memory (EPROM), electrically erasable programmable read only memory (EEPROM), etc.) and/or volatile memory 140 (e.g., random access memory (RAM)). A basic input/output system (BIOS) 142 may be stored in the non-volatile memory 138, and can include the basic routines that help to transfer information between elements within the computing device 130. The volatile memory 140 may also include a high-speed RAM, such as static RAM for caching data.

The computing device 130 may further include or be coupled to a computer-readable storage 148, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 148 and other drives, associated with computer-readable media and computer-usable media, may provide non-volatile storage of data, computer-executable instructions, and the like. Although the description of computer-readable media above refers to an HDD, it should be appreciated by those skilled in the art that other types of media which are readable by a computer, such as a solid state drives (SSD), floppy disks, magnetic cassettes, flash memory drives, flash memory cards, cartridges, optical media, and the like, may also be used in the exemplary operating environment, and further, that any such media may contain computer-executable instructions for performing novel methods of the disclosed architecture.

A number of modules can be stored in the computer-readable storage 148 and in the volatile memory 140, including an operating system 146 and one or more program modules 150, which may implement the functionality described herein in whole or in part. For example, the program modules 150 may include some or all of the algorithms above, such as, for example, the sizing algorithm 308, the new feature overlay algorithm 312, and/or the 3D printer translation algorithm 316 of the process 300 of FIG. 4.

All or a portion of the embodiments may be implemented as a computer program product stored on a transitory or non-transitory computer-usable or computer-readable storage medium, such as the computer-readable storage 148, which includes complex programming instructions, such as complex computer-readable program code, configured to cause the central processing unit 132 to carry out the steps described herein. Thus, the computer-readable program code can comprise software instructions for implementing the functionality of the embodiments described herein when executed on the central processing unit 132. The central processing unit 132, in conjunction with the program modules 150 in the volatile memory 140, may serve as a controller, or control system, for the computing device 130 that is configured to, or adapted to, implement the functionality described herein. The computing device 130 may also include a communication interface 152, suitable for communicating with other computing devices directly or via a network, as desired.

Those skilled in the art will recognize improvements and modifications to the preferred embodiments of the disclosure. All such improvements and modifications are considered within the scope of the concepts disclosed herein and the claims that follow.

What is claimed is:

1. A method of generating a physical map using an additive manufacturing process, the method comprising:
   receiving, at a computing device, topographic data corresponding to topographic features of a geographic area, wherein the topographic data comprises digital surface model data;
   receiving, at the computing device, map area data corresponding to a subset area of the geographic area;
   generating, at the computing device, map data based on the topographic data and the map area data;

modifying, at the computing device, the map data to generate modified map data by processing tactical imagery of at least a portion of the geographic area to correlate at least one object in the tactical imagery with a same at least one object in the digital surface model data of the topographic data, the digital surface model data corresponding to surface features of the geographic area; and converting the modified map data into a machine-readable format for generating a physical map using an additive manufacturing process, the physical map comprising a three-dimensional depiction of the topographic features of the subset area.

2. The method of claim 1, further comprising:
receiving, at the computing device, label data corresponding to an identifier for at least one geographic feature of the subset area,
wherein generating the modified map data further comprises processing the label data, and
wherein the physical map further comprises the identifier.

3. The method of claim 2, wherein the identifier is an alphanumeric identifier.

4. The method of claim 2, wherein the map data further comprises a base color for a first portion of the physical map, and
wherein the identifier comprises a highlight color for a second portion of the physical map different from the base color.

5. The method of claim 1, wherein the digital surface model data is selected from the group consisting of: precision terrain data, light detection and ranging (LiDAR) data, and point cloud data.

6. The method of claim 1, wherein the topographic data further comprises digital elevation model data corresponding to elevation features of the geographic area.

7. The method of claim 6, wherein the digital elevation model data is selected from the group consisting of: precision terrain data, light detection and ranging (LiDAR) data, and point cloud data.

8. The method of claim 1, wherein the topographic data further comprises subterranean model data corresponding to subterranean features of the geographic area.

9. The method of claim 1, wherein the topographic data further comprises the tactical imagery comprising a real-world image of the at least a portion of the geographic area.

10. The method of claim 9, wherein the tactical imagery comprises an aerial photograph of the at least a portion of the geographic area.

11. The method of claim 1, wherein receiving the topographic data further comprises receiving first topographic data corresponding to a first topographic feature of the at least a portion of the geographic area, and second topographic data corresponding to a second topographic feature of the at least a portion of the geographic area different from the first topographic feature.

12. The method of claim 1, wherein the map data comprises stereolithography (STL) data.

13. The method of claim 1, further comprising:
receiving, by an additive manufacturing device, the map data; and
generating, by the additive manufacturing device, a three-dimensional physical map of the subset area using the map data.

14. The method of claim 13, wherein the three-dimensional physical map comprises a flexible material such that at least a portion of the three-dimensional physical map is flexible.

15. The method of claim 13, wherein the three-dimensional physical map comprises a resilient material.

16. The method of claim 1, wherein generating the map data further comprises sizing the topographic data to match a scale of the subset area.

17. The method of claim 1,
wherein the digital surface model data comprises vector models corresponding to paths of interest within the geographic area;
wherein the topographic data further comprises digital elevation model data corresponding to elevation features of bare earth terrain of the geographic area, subterranean model data corresponding to a negative volume of a subterranean space of the geographic area, and the tactical imagery comprising a real-world image of the at least a portion of the geographic area.

18. The method of claim 1, wherein generating the map data is based on the tactical imagery, and the modified map data is based on new tactical imagery.

19. A computing device for generating a physical map using an additive manufacturing process, the computing device comprising a processing device configured to:
receive topographic data that identifies topographic features of a geographic area, including elevational features of the geographic area, wherein the topographic data comprises digital surface model data;
receive map area data that identifies a subset area of the geographic area;
generate map data based on the topographic data and the map area data;
modify the map data to generate modified map data by processing tactical imagery of at least a portion of the geographic area to correlate at least one object in the tactical imagery with a same at least one object in the digital surface model data of the topographic data, the digital surface model data corresponding to surface features of the geographic area; and
converting the modified map data into a machine-readable format for generating a physical map using an additive manufacturing process, the physical map comprising a three-dimensional depiction of the topographic features of the subset area of the geographic area.

20. The computing device of claim 19, the processing device further configured to cause an additive manufacturing device to additively manufacture a three-dimensional physical map of the subset area using the map data.

21. A non-transitory computer-readable medium comprising machine-readable instructions configured to cause a processing device to:
receive topographic data corresponding to topographic features of a geographic area, wherein the topographic data comprises digital surface model data;
process tactical imagery of at least a portion of the geographic area to correlate the tactical imagery with the digital surface model data of the topographic data, the digital surface model data corresponding to surface features of the geographic area;
receive map area data corresponding to a subset area of the geographic area;
generate map data based on the topographic data and the map area data;
modify, at the computing device, the map data to generate modified map data by processing the tactical imagery of the at least a portion of the geographic area to correlate at least one object in the tactical imagery with a same at least one object in the digital surface model data of the topographic data, the digital surface model data corresponding to surface features of the geographic area; and converting the modified map data into a machine-readable format for generating a physical map using an additive manufacturing process, the physical map comprising a three-dimensional depiction of the topographic features of the subset area.

22. The non-transitory computer-readable medium of claim 21, wherein the machine-readable format is further configured to cause the processing device to cause an additive manufacturing device to additively manufacture a three-dimensional physical map of the subset area using the map data.

23. A method of generating a physical map using an additive manufacturing process, the method comprising:

receiving, at a computing device, topographic data corresponding to topographic features of a geographic area, wherein the topographic data is comprised of digital surface model data corresponding to vector models of paths of interest within the geographic area, digital elevation model data corresponding to elevation features of bare earth terrain of the geographic area, and subterranean model data corresponding to a negative volume of a subterranean space of the geographic area;

receiving, at the computing device, map area data corresponding to a subset area of the geographic area;

receiving, at the computing device, tactical imagery of at least a portion of the geographic area;

processing, at the computing device, the tactical imagery based on the map area data to correlate the tactical imagery with the digital surface model data of the topographic data; and generating, at the computing device, map data based on a correlation of the tactical imagery and the digital surface model data, the map data comprising machine-readable instructions for generating a physical map using an additive manufacturing process, the physical map comprising a three-dimensional depiction of the topographic features of the geographic area corresponding to the subset area of the geographic area.

* * * * *